(12) United States Patent
Kirkham

(10) Patent No.: US 9,038,893 B2
(45) Date of Patent: May 26, 2015

(54) MULTI-PURPOSE TRANSACTION CARD AND ASSOCIATED METHODS AND SYSTEMS

(71) Applicant: Card Limited Corp., Lehi, UT (US)

(72) Inventor: Lori D. Kirkham, Lehi, UT (US)

(73) Assignee: Card Limited Corp., Lehi, UT (US)

( * ) Notice: Subject to any disclaimer, the term of this patent is extended or adjusted under 35 U.S.C. 154(b) by 169 days.

(21) Appl. No.: 13/626,890

(22) Filed: Sep. 26, 2012

(65) Prior Publication Data

US 2014/0084057 A1    Mar. 27, 2014

(51) Int. Cl.
*G06K 5/00* (2006.01)
*G06K 7/08* (2006.01)
*G06Q 20/34* (2012.01)
*G07F 17/00* (2006.01)

(52) U.S. Cl.
CPC ............ *G06Q 20/34* (2013.01); *G07F 17/0042* (2013.01)

(58) Field of Classification Search
USPC ............ 235/380, 451, 492, 449, 493, 375, 38
See application file for complete search history.

(56) References Cited

U.S. PATENT DOCUMENTS

| | | | | |
|---|---|---|---|---|
| 6,886,741 | B1* | 5/2005 | Salveson | 235/375 |
| 7,568,617 | B2* | 8/2009 | Silbernagl et al. | 235/382 |
| 2002/0169720 | A1* | 11/2002 | Wilson et al. | 705/44 |
| 2003/0004819 | A1* | 1/2003 | Dutta et al. | 705/26 |
| 2006/0118621 | A1* | 6/2006 | Burchette, Jr. | 235/380 |
| 2008/0135612 | A1* | 6/2008 | Silbernagl et al. | 235/382 |
| 2009/0283591 | A1* | 11/2009 | Silbernagl | 235/382 |
| 2010/0140351 | A1* | 6/2010 | Trenciansky | 235/383 |
| 2011/0011931 | A1 | 1/2011 | Farley et al. | |

FOREIGN PATENT DOCUMENTS

| | | |
|---|---|---|
| KR | 2002-0041375 | 6/2002 |
| KR | 2004-0085900 | 10/2004 |
| KR | 2007-0075986 | 7/2007 |

OTHER PUBLICATIONS

International Search Report, PCT/US2013/058294, Dec. 16, 2013.
English Abstract for KR 2002-0041375, Jun. 1, 2002.
English Abstract and English machine translation of KR 2007-0075986, Jul. 24, 2007.
English Abstract and English machine translation of KR 2004-0085900, Oct. 8, 2004.

* cited by examiner

*Primary Examiner* — Tuyen K Vo
(74) *Attorney, Agent, or Firm* — Holland & Hart LLP

(57) ABSTRACT

An approach for associating a card (e.g., a transaction card, an identification card, etc.) that corresponds to a primary account with one or more ancillary accounts (e.g., a library account, etc.) includes obtaining information from the card and associating that information with an ancillary account. The card may then be used to access the ancillary account. The card may be a transaction card and the primary account may be a financial account. The ancillary account may be a library account. When the card is a transaction card, fees associated with the ancillary account may be charged to the financial account.

17 Claims, 6 Drawing Sheets

200

| | ID | Name | Books Out | Fees Due | Address | Phone |
|---|---|---|---|---|---|---|
| 210a → | 56890 | Henry L'Hote | Life of Pi | 5.00 | 49 Memory Lane | 2439956782 |
| 210b → | G509d | John Sedra | Micro-electronics | 0.00 | 29 Mosfet Loop | 6543515586 |
| 210c → | Vnn39 | Martin Fierro | The Falklands | 0.00 | 32 Malvinas Way | 9750339164 |
| 210d → | B94Lk | James Brooke | Lord Jim | 15.00 | 12 Conrad Street | 9754832966 |

FIG. 2

| | ID | Name | Books Out | Fees Due | Address | Phone |
|---|---|---|---|---|---|---|
| 210a → | 56890 | Henry L'Hote | Life of Pi | 5.00 | 49 Memory Lane | 2439956782 |
| 210b → | G509d | Jane Sedra | Micro-electronics | 0.00 | 29 Mosfet Loop | 6543515586 |
| 210c → | Vnn39 | Martin Fierro | The Falklands | 0.00 | 32 Malvinas Way | 9750339164 |
| 210d → | B94Lk | James Brooke | Lord Jim | 15.00 | 12 Conrad Street | 9754832966 |
| 510 → | 7288j | Virgil Smith | Divine Comedy | 0.00 | 232 5$^{th}$ Cir. | 8016934162 |

MULTI-PURPOSE TRANSACTION CARD AND ASSOCIATED METHODS AND SYSTEMS

TECHNICAL FIELD

This disclosure relates generally to cards, such as transaction cards (e.g., bank cards, etc.) identification cards and the like, that can be used for multiple purposes. In particular, this disclosure relates to transactions cards that may also be used as library cards.

BACKGROUND OF RELATED ART

Transaction cards are commonly used in everyday life. Many people have bank cards that can be used to complete financial transactions (e.g., make purchases, obtain cash, conduct various transactions with a bank, etc.). Bank cards are popular given the wide range of merchants who accept them, the security of making purchases without having to carry cash, and the rewards and benefits often offered to the holder of a bank card by the issuing institution.

Cards are also used for a variety of other purposes. An employer may issue an identification (ID) card to its employees, which confirm each employee's relationship with the employer and may fulfill other functions, such as enabling employees to access secure parts of a building. Driver's licenses and other government-issued IDs are also used as proof of the identity of their holders. Library cards are used to access the holders' accounts with the library, allowing the card holders to check out books and, while a card holder checks out a book, enabling the library to identify which books the card holder currently has checked out and any fees that the card holder may owe to the library.

The abundance of cards that many people use in everyday life can present a challenge. Having to carry numerous cards at all times is inconvenient. If an individual chooses to carry only a small portion of his or her cards, the card holder risks leaving behind a card that he or she may need.

BRIEF DESCRIPTION OF THE FIGURES

In the Figures:

FIG. 2 illustrates an embodiment of a table that includes information for an auxiliary account (e.g., a secondary account, such as a library account, etc.) that may be associated with a card (e.g., a bank card, etc.);

FIG. 5 illustrates an embodiment of a modification of the table of FIG. 2, into which a new record that corresponds to the auxiliary account has been inserted.

SUMMARY

Figure 1:
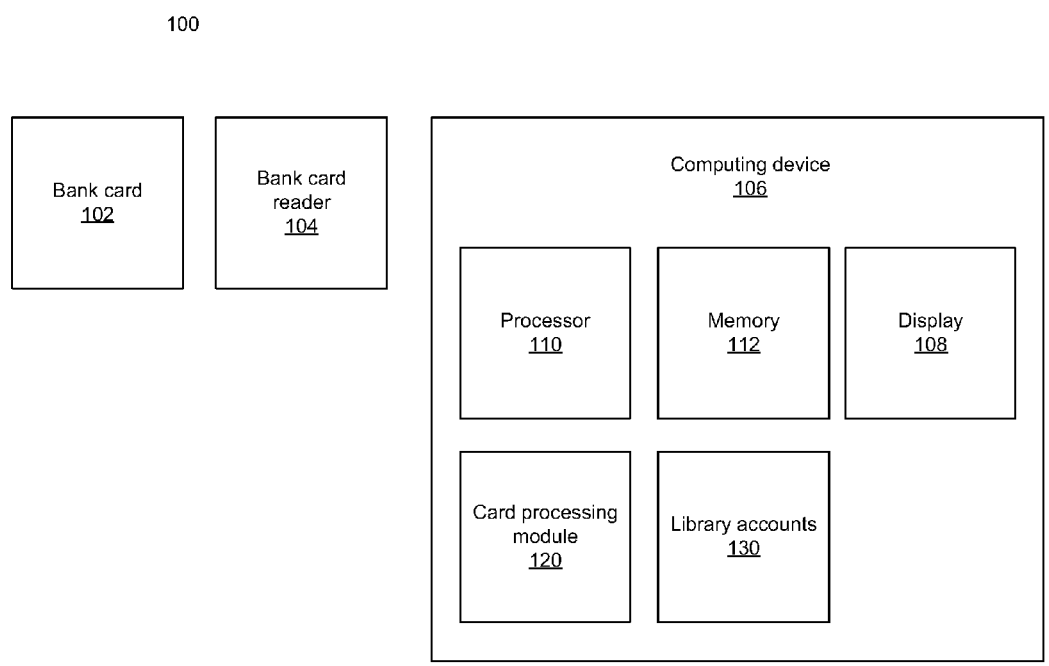
FIG. 1 is a schematic representation of an embodiment of a system including a card (e.g., a bank card, etc.), a reader for the card (e.g., a bank card reader, etc.), and a computing device that includes a card processing module.

This disclosure, in one aspect, relates to approaches for providing a multi-purpose card (e.g., a transaction card, an identification card, etc.). The card may be associated with a primary account (e.g, in embodiments where the card comprises a transaction card, with a financial account; etc.) and one or more auxiliary accounts. In a specific embodiment, the card is configured for use as both a traditional bank card (e.g., a credit card, a debit card, etc.) that facilitates financial transactions, and as a library card that enables the holder to check out books from a library where the holder has an account. The multiple (i.e., two or more) functions of such a transaction card may be effected by way of information stored in a computer-readable medium on the card. In some embodiments, a plurality of the functions of such a transaction card may be enabled by a single computer readable medium. In other embodiments, a transaction card may include a plurality of computer-readable media to enable different functions. Some non-limiting examples of the computer-readable media of a transaction card include a magnetic strip, the integrated circuit of a so-called "smart card," or any combination of computer readable media.

Methods for providing and/or obtaining a multi-purpose card are also disclosed. When an individual obtains a multi-purpose card, the card may initially be associated with a first, or primary, purpose or account (e.g., a financial account, an entity (in the case of an identification card), etc.). The card may be associated with its primary purpose by a card issuer. The card may then be associated with one or more additional purposes, or accounts (e.g., a library account, etc.). The card issuer may associate the card with one or more additional purposes, or accounts, or the individual may have the administrator of one or more additional purposes for the card associate the card with those purposes or their corresponding accounts. In some embodiments, the subsequent association of a card may be effected by creating a secure hash using information that corresponds to the primary purpose of the card (e.g., its use as a bank card, etc.) and saving the secure hash in conjunction with an account that corresponds to an additional, or ancillary, purpose for the card. That secure hash may then enable the card holder to access the account and, thus, to use the card for the ancillary purpose. Alternatively, the card may be associated with an account that corresponds to an ancillary purpose by saving, or "writing" data to a previously blank, or "unwritten," portion of a magnetic stripe of the card, by saving data to an integrated circuit or other data storage element of the card, or by otherwise writing data to the card or associating data already on the card with a new account.

In a method of use, the holder of a multi-purpose card may separately use the card for each of its purposes (e.g., to effect financial transactions, to check out books from the library, etc.). In some embodiments, the different purposes for the card may also be linked to one another. Continuing with the embodiment of a card that serves as both a bank card and a library card, the library may periodically (e.g., monthly, etc.) apply fees to the bank card (e.g., charge fees to a credit account associated with a credit card, deduct fees from a bank account associated with a debit card, etc.) to settle its account with the card holder.

In another aspect, a system for processing transactions made with a multi-purpose card is disclosed. In various embodiments, such a system may include a computer program stored on a computer-readable storage medium, as well as one or more card readers (e.g., magnetic stripe readers, smart card readers, etc.). Each card reader may be configured to obtain information from the card, while the computer program may be configured to receive information corresponding to a primary purpose for the card (e.g., bank card information from a bank card reader, etc.) and/or an ancillary purpose with which the card has been associated, and to retrieve information from an account (e.g., the bank account, a library account, etc.) that corresponds to each purpose. In some embodiments, in processing information that corresponds to one purposes of the card, the computer program may access or use another of the purposes of the card to complete a transaction between the two purposes. Continuing with the embodiment where the card serves as both a bank card and a library card, the computer program may receive information about fees associated with the library account, and may automatically access the corresponding financial account to settle the fee balance of the library account. The computer program may cause sufficient information about the card and its associated accounts to generate requests for payment of library fees from the financial account to the library without requiring the physical presence of the card. The computer program, in other embodiments, may generate requests for payment of fees when the card holder presents the card at an appropriate location (e.g., a library, etc.).

The computer program of such a system may be used to create a new account (e.g., a library account, etc.) and associate the new account with a card presented by the card holder, or to associate the card with an existing account. The computer program may create a secure hash using information that corresponds to the primary purpose of the card (e.g., its use as a bank card, etc.) and save the secure hash as information that corresponds to the new account (e.g., the library account, etc.), or ancillary purpose for the card. The computer program may subsequently identify the account when the card is presented (e.g., to a card reader, etc.) by generating a secure hash from the information associated with the primary purpose of the card and by locating a library account associated with an identical, previously stored secure hash.

Other aspects, as well as features and advantages of various aspects, of the disclosed subject matter will become apparent to those of ordinary skill in the art from the ensuing description, the accompanying figures, and the appended claims.

DETAILED DESCRIPTION

This disclosure makes reference to one or more modules. A module refers to a component for executing one or more functions. The module may be embodied as hardware, firmware, software, or a combination thereof. The module may include one or more instructions that are stored in one or more memory locations and that are executable by a processor. These instructions may be stored in the same storage unit, or dispersed across separate storage units. The module may be stored in volatile and/or non-volatile memory. The module may be embodied as a computer program stored on a computer-readable storage medium. The computer-readable storage medium may be any tangible storage medium capable of storing a computer program.

FIG. 1 illustrates one embodiment of a system 100 for using a transaction card 102 for two or more purposes, or for multiple purposes. Although the term "transaction" is used to refer to a card that may be used for any number of different purposes, any of a variety of different types of cards that have any of a variety of different primary purposes (e.g., as identification cards, etc.) and that include components that may store data may be used in accordance with teachings of this disclosure. FIG. 1 shows a system 100 that includes a transaction card 102, a card reader 104, and a computing device 106.

The transaction card 102 is an item used to facilitate a particular type of transactions. In some embodiments, those transactions may comprise financial transactions. The transaction card 102 may be issued by an institution such as a bank, a credit union, or another entity to a holder, such as an individual, a business, or another party. Although the term "bank card" may be used herein to refer to some embodiments of transaction cards, the term "bank card" is not intended to be limited to cards issued by banks. The transaction card 102 may be a credit card, a charge card, a debit card, or another type of card for facilitating financial transactions.

The transaction card 102 includes a storage medium for storing information that corresponds to a primary account (e.g., a financial account, etc.) with which the transaction card is associated. The storage medium may be a magnetic stripe, a radio-frequency identification (RFID) device, a near field communication (NFC) device, or any other suitable storage medium. The form of the transaction card 102 may vary based on the particular implementation; for example, the transaction card 102 may be a plastic card or a metal card compliant with the standards for bank cards promulgated by the International Organization for Standardization (ISO). In another embodiment, the bank card 102 may be comprise a component of a mobile device (e.g., Google® Wallet, etc.). The information stored by the storage medium of the transaction card 102 may include a variety of data that facilitates a transaction (e.g., a financial transaction in embodiments where the transaction card is a bank card, etc.). The information may include the primary account number, the name of the holder of the transaction card 102, the expiration date of the transaction card 102, and other data. The content of the information and its structure may comply with the ISO/IEC 7813 standard.

In certain embodiments, the transaction card 102 may include information that is specific to use of the transaction card 102 for an ancillary purpose, or in conjunction with an auxiliary account (e.g., a library account, etc.). For example, the magnetic stripes on many transaction cards include up to three tracks of data. The content and structure of the data on a magnetic stripe may be defined by one or more standards. Some standards allow for the storage of discretionary data, or the use of proprietary data and data formats, by a the magnetic stripe of a transaction card. The transaction card 102 may include information that is specific to use of the transaction card 102 for the ancillary purpose (e.g., as a library card, etc.) in one or more sections of its magnetic stripe. The transaction card 102 may include, for example, a library account number, a unique identifier (ID) for use in connection with the ancillary account 130, or other data. As an alternative, or in addition to storing data specific to the use of the transaction card 102 for its ancillary purpose on a magnetic stripe, such data may be stored by any other technology suitable for use with a transaction card 102.

The card reader 104 reads the information from the transaction card 102 by implementing a solution for reading one or more storage media of the transaction card 102. The card reader 104 may, for example, include a magnetic stripe reader, an RFID reader, an NFC reader, or any other suitable mechanism for detecting and obtaining information from a storage medium of a transaction card 102. The card reader 104 may implement more than one approach, allowing the card reader 104 to read transaction cards 102 with different storage media. The card reader 104 may information obtained from a transaction card 102 to a computing device 106.

The computing device 106 may comprise a device that includes a processor 110 for executing instructions and a memory 112 for storing data. The computing device 106 may be a desktop computer, a laptop computer, a server, a smart phone, or any other suitable computing device 106. The computing device 106 and the card reader 104 may be physically separate devices that communicate using a wired connection or a wireless connection. The card reader 104 may be a peripheral device that couples to the computing device 106 using a standard connector such as Universal Serial Bus (USB), firewire, or any other suitable means of communication. The computing device 106 may, in one embodiment, be remote and communicate with the card reader 104 over a network such as the Internet. In another embodiment, the card reader 104 may be integrated into the computing device 106 and communicate with the processor 110 and memory 112 using a bus.

In the embodiment shown in FIG. 1, the computing device 106 is used in connection with a library and stores information about a variety of library accounts 130 held by different parties at the library. Each library account 130 may be identified with one or more users of the library. Each library account 130 may contain library account information that describes the library account 130, as discussed in greater detail below. The library accounts 130 may be maintained in a database on the computing device 106.

The computing device 106 may include a card processing module 120 that identifies a library account 130 associated with the information on the transaction card 102, and that retrieves library account information from the library account 130 associated with the information on the transaction card 102. The card processing module 120 may cause information about that library account to be displayed on a display 108 for the computing device 106.

In the system 100, the transaction card 102 may be used for another purpose in addition to facilitating a financial transaction; the transaction card 102 may be used to identify a library account 130 for the holder of the transaction card 102. The card processing module 120 may enable this additional purpose by associating the information from the transaction card 102 with a library account 130 when the library account 130 is created. In such an embodiment, a library employee or transaction card holder may thereafter retrieve library account information from the library account 130 by presenting the transaction card 102 to the card reader 104. The system 100 may be used for a variety of institutions other than a library; for example, the system 100 may be configured to work in a similar fashion for a department store, a grocery store, or other institution where an account is kept for a holder of a transaction card 102.

FIG. 2 shows an embodiment of a table 200 in which library account information is stored. The table 200 may be implemented and managed using a database management system (DBMS). Data structures other than a table may also be used for tracking library accounts 130. A particular system may implement a plurality of tables in addition to the table 200 for managing library accounts 130; the table 200 is provided only by way of example.

The table 200 includes multiple records 210a-210d. Each records 210 may also be referred to as a "row" or a "tuple." Each record 210 may represent one library account 130 referenced in connection with process disclosed in reference to FIG. 1. The columns of the table 200 illustrate varieties of library account information that may be collected and maintained. The nature of the library account information may vary across different implementations. In the depicted embodiment, the library account information includes: ID; Name; Books Out; Fees Due; Address; and Phone.

The card processing module 120, referenced in connection with FIG. 1, may identify a library account 130 associated with the bank card information of the transaction card 102. In one embodiment, the value in the ID field of a record 210 may be related to the bank card information. The ID field may contain a unique key that can be used to locate and uniquely identify a particular record 210. In one embodiment, the ID value and the information from the transaction card 102 are identical. In such an embodiment, the card processing module 120 may receive information from the transaction card 102 and search the table 200 for a record 210 with a value in the ID field that is identical to the information on that transaction card 102. If the card processing module 120 finds a value in the ID field that is identical to the bank card information, the card processing module 120 may retrieve the library account information in that particular record 210.

In another embodiment, the ID values use only a portion of the information from a transaction card 102. For example, the ID value may be a combination of the name in the bank card information and the last 4 digits of a primary account number in the information from the transaction card 102. In such an embodiment, the card processing module 120 may extract the relevant portions of the information on the transaction card 102, and received from the bank card reader 104, and format the extracted portions to match the formatting of the ID values. The card processing module 120 may then search the table 200 for an ID value that is identical to the extracted, formatted portions of the bank card information. If a match is found, the library account 130, represented by the record 210 associated with the found ID value, may be retrieved.

In another embodiment, the ID value may be a secure hash generated from the information of the holder of the transaction card 102, who created the library account 130. The secure hash may be generated from all of the information on the transaction card 102 or from a portion of it. In such an embodiment, the card processing module 120 may receive the information from the transaction card 102 and apply a hash function to that information. The hash function may be a cryptographic hash function, such as secure hash algorithm (SHA)-0, SHA-1, SHA-2, or any another cryptographic hash function. The card processing module 120 may compare the output of the hash function with the values in the ID fields in the records 120. If the card processing module 120 finds a record 120 with an ID value that is identical to the secure hash, the card processing module 120 may identify the library account 130 represented by that record 120 as associated with the information on the transaction card 102 and retrieve information from the library account that has been associated with that transaction card 102. Storing a secure hash generated from the information on the transaction card 102 in the ID field of the record 210, as opposed to storing the information from the transaction card 102 itself, or a portion of that information, may provide an added measure of security since sensitive transaction card information is not itself stored by the computing device 106, or otherwise in connection with the library account. If the computing device 106 is stored at a checkout desk in a library, it may be susceptible to theft or data breach. Storing a secure hash of the information on a transaction card 102, as opposed to that information itself, may reduce the possibility of sensitive information being misused or stolen.

Each record 210 may also identify the books currently checked out from the library account 130 that is represented by that particular record 210. The "Books Out" field may associate a particular record 210 representing a library account 130 with one or more records in other tables representing books in the library, as will be appreciated by those in the art. The record 210 may also include the fees due for the library account 130 associated with the record 210. The computing device 106 may implement one or more modules that determine whether a particular book is overdue. These modules may populate the "Fees Due" field of each record 210 with appropriate fees. Fees such as annual fees, fees for damaging a book, and others, may also be calculated and added to the "Fees Due" field of each record 210. The fees associated with a particular library account 130 may be stored as library account information.

Figure 3:
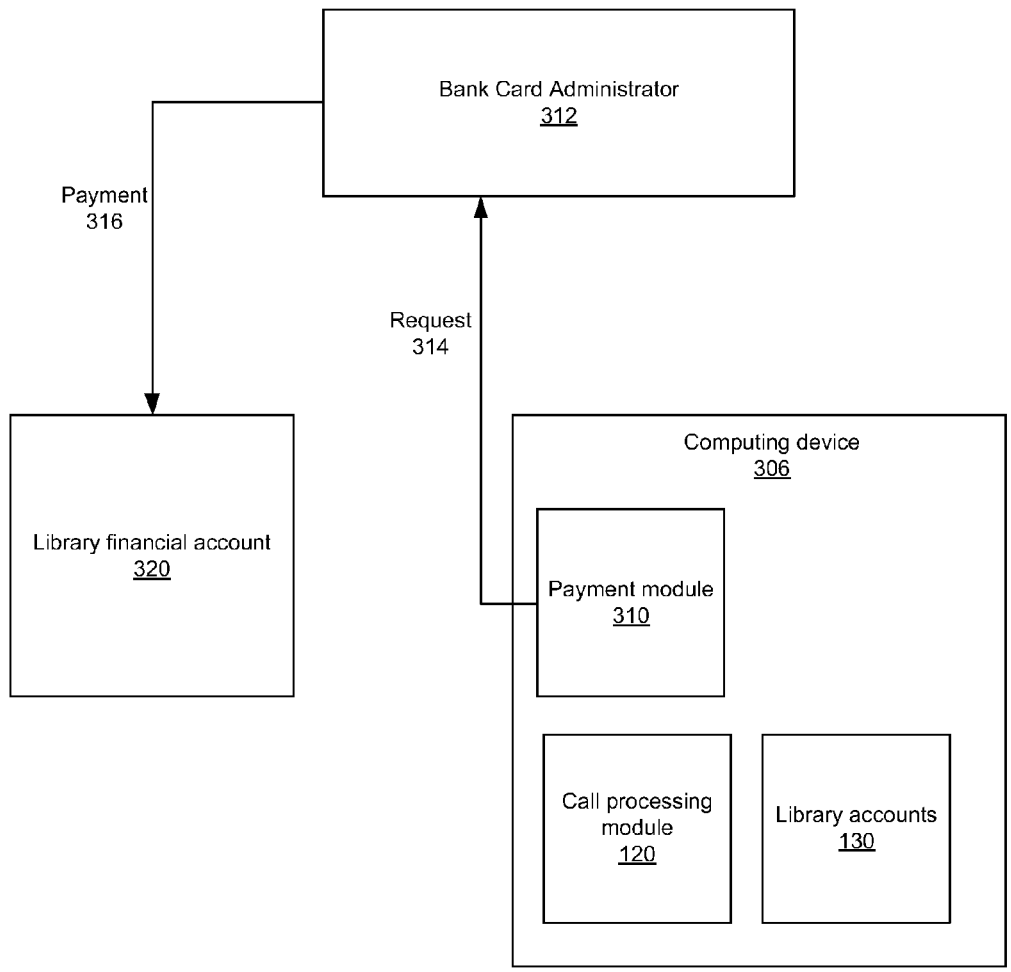
FIG. 3 is a schematic representation of an embodiment of a system in which a system that manages an auxiliary account (e.g., a secondary account, such as a library account, etc.) that has been associated with a card (e.g., a bank card, an identification card, etc.) is configured to request payment from an administrator of a primary account (e.g., a bank account, a credit account, etc.) with which the card is associated.

FIG. 3 shows an embodiment of a system 300 comprising an administrator 312 of the transaction card 102 (FIG. 1) with which the library account 130 and at least one financial account are associated. In addition, the system 300 includes at least one computing device 306, which may comprise a card processing module 120, one or more library accounts 130, as described in reference to FIG. 1, and a payment module 310. As explained above in connection with FIG. 2, one or more fees may be incurred by the holder of a particular library account 130. The payment module 310 of the computing device 306 may be programmed to request payment from the card administrator 312 in an amount equal to the outstanding fees for a particular library account 130 associated with a particular transaction card 102. Such requests may be made periodically (e.g., monthly, etc.) or each time the transaction card 102 is used to access the library account 130.

The card administrator 312 may be a bank, credit union, or other institution that manages accounts associated with a transaction card 102. The card processing module 120 may save information from the transaction card 102 that enables the payment module 310 to request payment from the card administrator 312 when fees are incurred in connection with the library account 130. The card processing module 120 may, for example, save the primary account number, the name, and the expiration date from the transaction card 102. The card processing module 120 may store that information as library account information in the library accounts 130. Alternatively, in embodiments where the payment module 310 is programmed to request that fees incurred in connection with the library account 130 be paid (e.g., automatically, at the account holder's option, etc.) when the transaction card 102 is used at the library, there is no need to store sensitive information from the transaction card 102 in connection with the library account 130.

In the embodiment shown in FIG. 3, the payment module 310 generates the request 314 that requests payment in the amount of the fees due for the library account 130 from the card administrator 312. The request 314 may specify the transaction card 102 associated with the library account 130. The card administrator 312 may receive the request 314, and, after processing it, provide payment 316 to the library or, more specifically, to a financial account 320 held by the library. The payment module 310 may cause the payment 316 to be reflected in the library account 130. For example, if the fees due on the library account 130 were ten dollars, and the card administrator 312 provides a payment 316 in the amount of ten dollars, the payment module 310 may adjust the fees due on the library account to zero.

Figure 4:
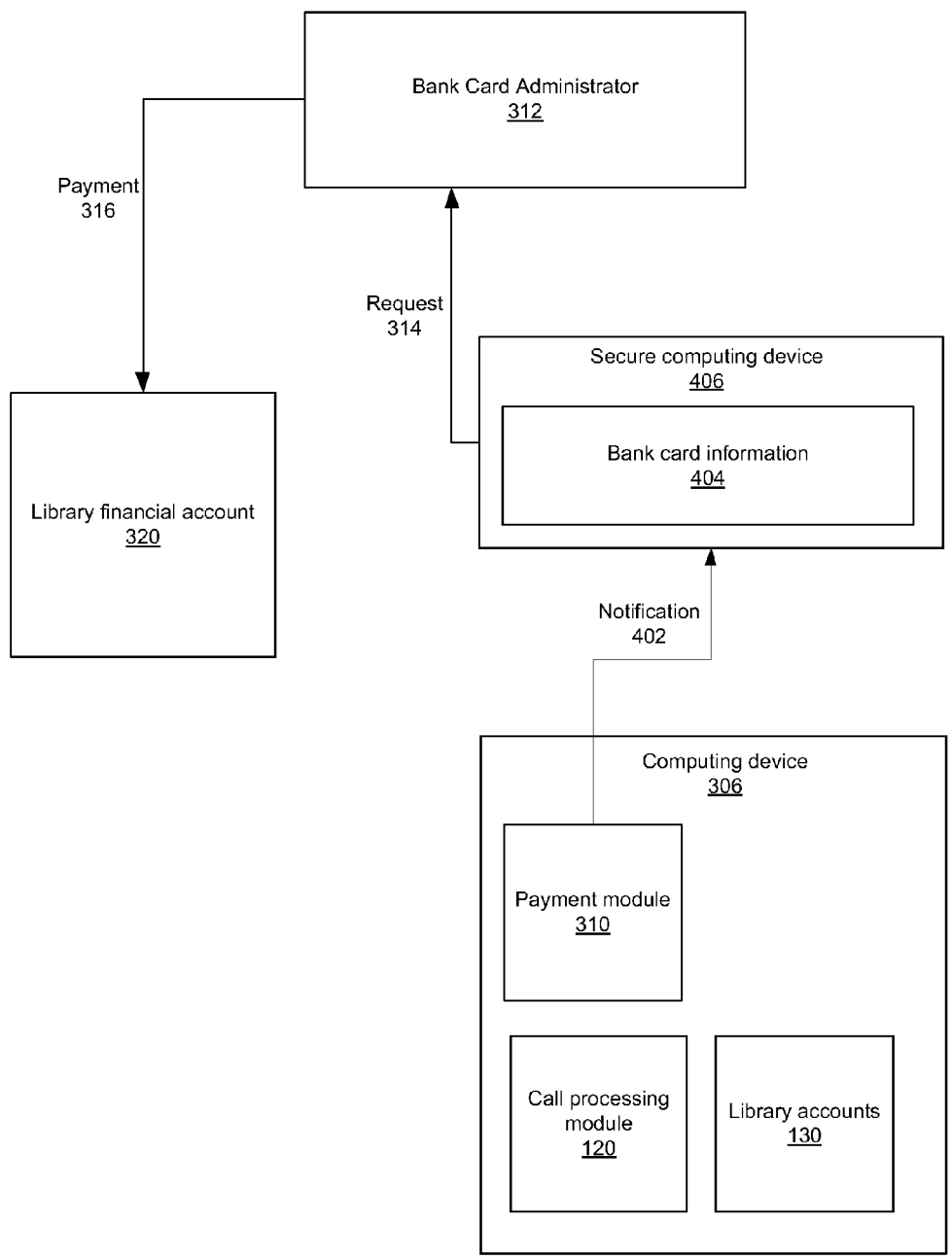
FIG. 4 is a schematic representation of another embodiment of a system that manages an auxiliary account that has been associated with a card, and that has been configured to request payment from an administrator of a primary account with which the card is associated.

FIG. 4 shows a system 400 where a request 314 for payment is generated by a secured computing device 406 that has enough information 404 from the transaction card 102 (FIG. 1) to generate the request 314. The secured computing device 406 may be located in a secure area of the library (e.g., remote from the check-out desk, at a location without public access, at a location where access is limited to specific employees, etc.). Alternatively, the secured computing device 406 may be located at a different physical facility, and may communicate with the computing device 306 over the Internet.

In one embodiment, the payment module 310 generates a notification 402 that is sent to the secure computing device 406 to notify the secure computing device 406 of outstanding fees associated with a library account 130. The notification 402 may include an ID as discussed in connection with FIG. 2. The notification 402 may also include the amount of the fees to be charged to the transaction card 102 associated with the library account 130. Other information may also be transmitted with the notification 402.

The secure computing device 406 may receive the notification 402. The secure computing device 406 may use the ID provided in the notification 402 to find and retrieve the information 404 associated with the transaction card 102 that is required for the library to post a transaction for the fees due in connection with the library account 130 that has been associated with the same transaction card 102. The card administrator 312 may make a payment 316 to the library financial account 320 after receiving the request 314. Such an embodiment may provide increased security by storing sensitive information 404 from a transaction card 102 in the secure computing device 406, as opposed to a potentially less secure computing device 306 that stores information about the library account 130.

In certain embodiments, the payment module 310 may be configured to receive a confirmation that the request 314 has been successfully processed, resulting in a payment 316 to the library's financial account 320. The payment module 310 may await confirmation before crediting the library account 130 for the payment 316 of fees. The payment module 310 may be configured to suspend the library account 130 if the information 404 from the transaction card 102 that has been associated with the library account 130 (and, thus, the transaction card 102 itself) is invalid (e.g., if the transaction card has expired, if the account(s) associated with the transaction card is (are) frozen, if the transaction card or the account(s) associated therewith cannot be used to make the payment 316 in response to the request 314, etc.) the payment module 310 may suspend the library account 130. If the library account 130 is suspended, the card processing module 120 may be configured to prompt the holder of the library account 130 to provide updated information 404 (e.g., a new transaction card 102, etc.).

The system 400 may be configured to generate the requests 314 for payment from the card administrator 312 if the library account 130 includes outstanding fees. The system 400 may generate the requests 314 on a schedule. For example, the payment module 310 may generate a notification 402 for each library account 130 that has an outstanding balance at the end of each month. In other embodiments, the system 400 generates the requests 314 upon the occurrence of particular events. For example, when the holder of a transaction card 102 (FIG. 1) uses that transaction card 102 to access (e.g., to check out an item, etc.) a library account 130 with an outstanding balance, the payment module 310 may generate a notification 402. The payment module 310 or the notification 402 may require payment 316 of the outstanding balance before allowing the holder of the library account 130 is allowed to check the item out. As another option, the system 400 may use a combination of schedule-driven approaches and event-driven approaches to generating requests 314.

In the embodiments discussed in connection with FIG. 3 and FIG. 4, the information 404 may be retained on the computing device 106 or on a secure computing device 406, allowing the card processing module 120 to submit requests 314 for payment without requiring the presence of the transaction card 102 (FIG. 1) to create the request 314. In other embodiments, the information 404 is not retained. In such embodiments, the card processing module 120 may be configured to request payment from the card administrator 312 when the holder of the transaction card 102 is present and presents the transaction card 102. For example, when the card holder presents the transaction card 102 to check out an item from the library, the card processing module 120 may determine whether there are any outstanding fees associated with the card holder's library account 130. The card processing module 120 may generate the request 314 for payment in an amount sufficient to cover the outstanding fees before letting the card holder check out the book. Such an embodiment may provide additional security since the information 404 is not stored in the library or by computing devices 306 used by the library.

In such an embodiment, the card processing module 120 may be configured to purge the information 404 from the transaction card 102 after processing the information 404. For example, in embodiments where the card processing module 120 generates a secure hash from the information 404, the card processing module 120 may purge the information 404 from one or more computing devices 306 after generating the secure hash. Purging the information 404 may involve flushing one or more caches in the computing device 306 that may have stored the information 404. Purging the information 404 may further involve causing the bank card reader 104 to write over any memory addresses that store the information 404 as part of the reading and sending process. Purging the information 404 may also involve taking other steps to ensure that the information 404 is not stored by any component of the system 400.

FIG. 5 illustrates a table 500 where a new record 510 representing a new library account 130 (FIG. 1) is created. With returned reference to FIG. 1, in certain instances, a library user may want to create a library account 130. The card processing module 120 may be configured to create the new library account 130 and associate it with a transaction card 102 held by the holder of the new library account 130. A library worker may prompt the card processing module 120 to create a new library account 130 with information 404 from the transaction card 102. In another embodiment, if a card holder presents a transaction card 102 to a card reader 104, and the card processing module 120 determines that no library account 130 has been associated with that transaction card 102, the card processing module 120 may ask the card holder if he or she wants to associate an existing library account 130 with the transaction card 102 or create a new library account 130.

The card processing module 120 may associate the new or selected library account 130 with the information 404 (FIG. 4) from the transaction card 102 and, thus, with the transaction card 102. The card processing module 120 may also verify the validity of the transaction card 102 as part of the process of creating a new library account 130 or associating an existing library account 130 with the transaction card 102. The card holder may not be allowed to use the library account 130 until the card processing module 120 verifies that the transaction card 102 associated with the library account 130 is valid.

In embodiments where a new library account 130 is opened, the card processing module 120 may be prompted to create a new record 510 that represents the new library account 130. The card processing module 120 may receive information 404 from the transaction card 102 that is associated with the new record 510. The card processing module 120 may populate one or more fields of the new record 510 with that information 404. As discussed previously herein, the card processing module 120 may create an ID value from the information 404, which ID value associates the information 404 and the new record 510. The card processing module 120 may populate one or more additional fields using the information 404; for example, the card processing module 120 may extract the name and address of the card holder from the information 404 and populate the "Name" and "Address" fields of the new record 510 with that information. In some embodiments, the card holder may provide additional information to populate the fields of the new record 510. The card processing module 120 may be further configured to contact the card administrator 312 to verify the validity of the information 404 before allowing the card holder to check one or more items out of the library.

The card processing module 120 may be further configured to process changes in the information for a particular library account 130, including any information 404 from a transaction card 102 that has been associated with that library account 130. For example, a library account holder may also obtain a new transaction card 102 and, thus, information 404 about the transaction card 102 associated with his or her library account 130 may change. As another example, personal information for a library account holder, including information 404 from that library account holder's transaction card 102 (e.g., his or her address, legal name, etc.), may change even though the same primary account may continue to be associated with that library card. The card processing module 120 may be configured to update the library account 130 to associate the library account 130 with the new information 404.

In one embodiment, the library account holder may notify a library worker that she wishes to associate a new transaction card 102 with her existing library account 130. In reference to FIG. 5, the card processing module 120 may receive the new information 404, generate a new ID value from the information 404, and replace the existing ID for the existing record 502 representing the account holder's library account 130 with new ID generated from the new information 404. The card processing module 120 may validate the new information 404 before allowing the library account holder to check items out of the library.

Figure 6:
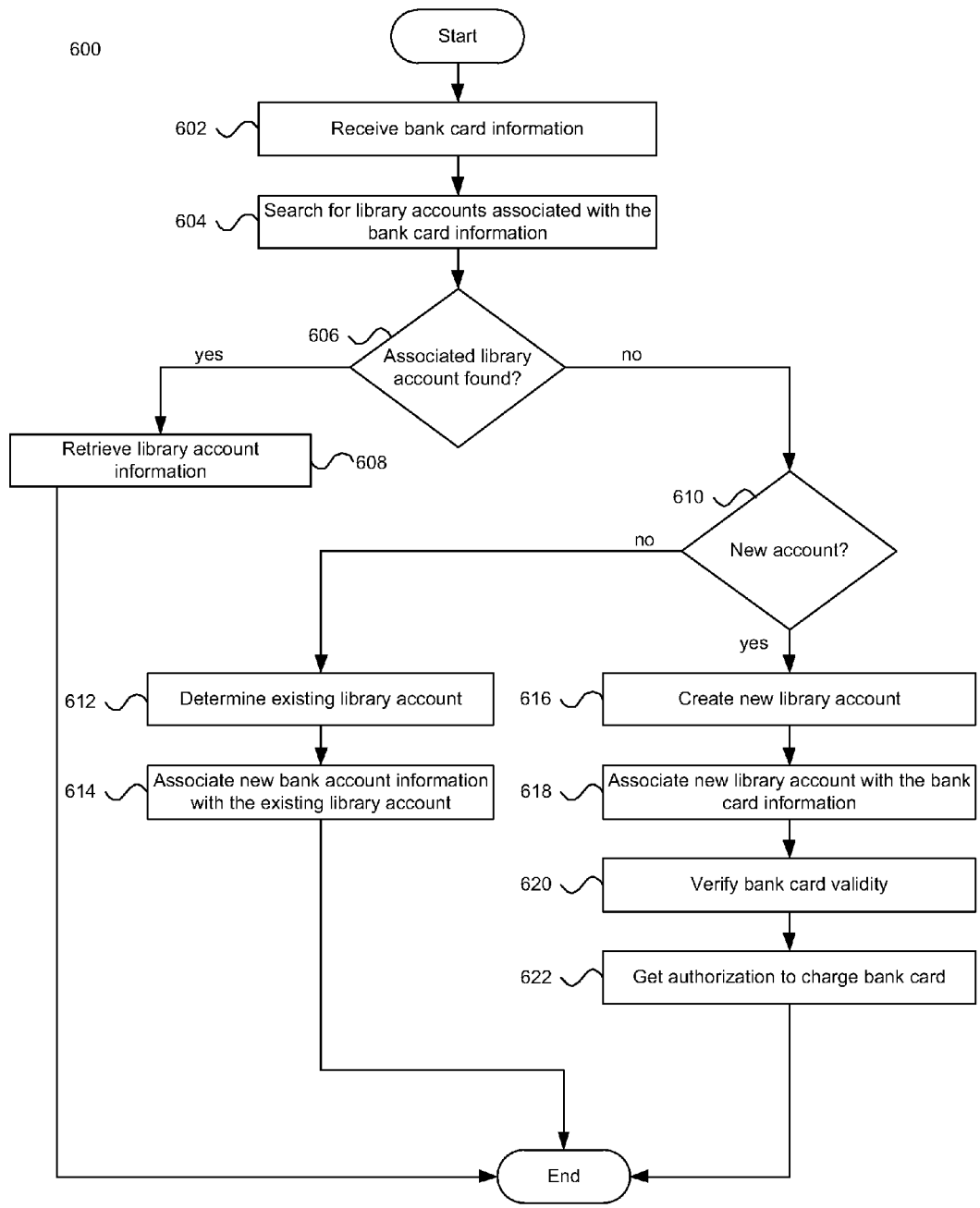
FIG. 6 is a flow chart illustrating an embodiment of a method for associating a card and, optionally, its corresponding primary account with an auxiliary account (e.g., a secondary account, such as a library account, etc.).

FIG. 6 illustrates an embodiment of a method 600 for using a transaction card 102 (FIG. 1) in connection with a library account 130 (FIG. 1). At reference 602, a card processing module 120 may receive information 404 (FIG. 4) from the transaction card 102 by way of a card reader 104 (FIG. 1) to which the transaction card 102 has been presented. The card processing module 120 may, at reference 604, search for a library account 130 associated with the information 404 from the transaction card 102. The card processing module 120 may, at reference 606, determine whether the information 404 corresponds to a library account 130 in an associated database. If the card processing module 120 determines that a library account 130 is associated with the information 404, the card processing module 120 may, at reference 608, retrieve the library account information from that library account 130.

If the card processing module 120 determines, at reference 606, that there is no library account 130 in the database associated with the information 404 from the transaction card 102, the card processing module 120 may, at reference 610, enable the holder of the transaction card 102 to associate the transaction card 102 with an existing library account 130 or create a new library account 130 with which the transaction card 102 is to be associated. In one embodiment, the card processing module 120 prompts an individual using the computing device 106 to provide an input indicating whether to create a new library account 130 using the information 404, or to associate the information 404 with an existing library account 130.

If the card processing module 120, at reference 610, associates the information 404 from a particular transaction card 102 with an existing library account 130, the card processing module 120 may, at reference 612, determine which existing library account 130 in the database is associated with the holder of the transaction card 102. The card processing module 120 may request that the holder of the library account 130 provide information 404 from a transaction card 102 that was previously associated with the library account 130 by, for example, presenting the old transaction card 102 to a card reader 104 that communicates with the computing device 106. The card processing module 120 may then use the old transaction card 102 to find the existing library account 130. Optionally, the card processing module 120 may require that the party attempting to access and change the library account 130 provide personal information, such as a name and address of the library account holder, in order to locate the appropriate existing library account 130. The card processing module may also, or in the alternative, use other approaches for finding an existing library account 130.

In some embodiments, the card processing module 120 may implement one or more security measures before associating different information 404 from a new transaction card 102 with an existing library account 130. As mentioned previously herein, the card processing module 120 may require that the individual present information 404 from a transaction card 102 that was previously associated with the library account 130 and/or that the individual provide personal information. Optionally, the card processing module 612 may require that the individual supply a password previously associated with the library account 130. Other security measures may also be implemented before associating new bank card information 404 with an existing library account 130.

The card processing module 120 may then, at reference 614, associate information 404 from the transaction card 102 with the existing library account 130. In one embodiment, the card processing module 612 replaces the information 404 from a previous transaction card 102 in the existing library account 130 with the information 404 from a newly associated transaction card 102. In another embodiment, the card processing module 120 may associate the existing library account 130 with the information 404 from a new transaction card 102 while maintaining the association of a previously used transaction card 102 with the library account 130. This may be desirable when, for example, spouses share a library account 130, an individual uses two or more transaction cards, or under a variety of other circumstances.

The card processing module 120 may alternatively determine, at reference 610, that a new library account 130 is desired. The card processing module 120 may, at reference 616, create the new library account 130 in the database for the holder of the transaction card 102, using information 404 from that transaction card 102. The card processing module 120 may associate, at reference 610, the new library account 130 with the information 404 from the transaction card 102. As discussed previously herein, associating the new library account 130 with information 404 from a transaction card 102 may involve generating and saving a secure hash of the information 404 in the new library account 130. The card processing module 120 may also request that the holder of the transaction card 102 provide additional information to set up the new library account 130. For example, the card processing module 120 may ask that the holder provide a password, a telephone number, an email address, or other information.

The card processing module 120 may, at reference 620, verify the validity of the transaction card 102. The card processing module 120 may, for example, use electronic verification techniques to confirm that the transaction card 102 is valid before allowing the holder of the transaction card 102 to associate it with a library account 130 or check items out of the library. The card processing module 120 may, at reference 622, request preauthorization, or blanket authorization, from the holder of the transaction card 102 to charge all fees (e.g., past fees that are still owed, current fees, future fees, etc.) associated with the library account 130 to a primary account (e.g., a bank account, a credit account, etc.) associated with the transaction card 102. Such authorization may enable the card processing module 120 to submit requests for payment of fees to the card administrator 312 without receiving express authorization for each request.

The disclosed embodiments relate to the association of a transaction card, such as a bank card, with a library account. It should be understood, however, that the teachings presented by this disclosure more broadly relate to associating any type of card (e.g., a transaction card, an identification card, etc.) that has been provided in connection with a primary account with at least one other ancillary account.

Although the foregoing description contains many specifics, these should not be construed as limiting the scope of the disclosure, but merely as providing illustrations of some embodiments of the disclosed subject matter. Similarly, other embodiments may be devised which do not depart from the spirit or scope of the disclosed subject matter. Features from different embodiments may be employed in combination. The scope of each claim is, therefore, indicated and limited only by its plain language and the legal equivalents thereto, rather than by the foregoing disclosure. All additions, deletions and modifications to the disclosed subject matter which fall within the meaning and scope of the claims are to be embraced by the claims.

What is claimed:

1. A method for managing a library account, comprising:
   receiving information from a transaction card;
   generating a secure hash using at least a portion of the information from the transaction card;
   determining whether the generated secure hash matches an account secure hash of a library account;
   identifying the library account as being associated with the information when the account secure hash of the library account matches the generated secure hash, the library account comprising library account information; and
   retrieving the library account information from the library account in response to identifying the library account associated with the information.

2. The method of claim 1, further comprising:
   storing one or more fees associated with the library account as library account information.

3. The method of claim 2, further comprising:
   requesting payment of the one or more fees associated with the library account from a card administrator for the transaction card.

4. The method of claim 1, further comprising:
   in response to not identifying a library account associated with the information from the transaction card,
   associating a library account with the transaction card.

5. The method of claim 4, wherein associating the library account with the transaction card comprises associating at least one of a new library account and an existing library account with the information from the transaction card.

6. The method of claim 1, further comprising:
verifying a validity of the transaction card.

7. The method of claim 6, further comprising:
suspending the library account in response to the transaction card being invalid.

8. The method of claim 1, further comprising:
associating a selected existing library account with information from the transaction card upon an initial presentation of the transaction card and the information.

9. The method of claim 1, further comprising:
creating the account secure hash for the library account using the information from the transaction card; and
storing the account secure hash in the library account information of the library account associated with the transaction card.

10. The method of claim 9, wherein identifying the library account associated with the information from the transaction card comprises:
identifying the library account in which the library account information comprises the account secure hash.

11. A system in which an ancillary account is configured to be associated with a transaction card for use in connection with a primary account, comprising:
a card reader configured to obtain information from the transaction card presented thereto;
a computing device configured to:
receive the information from the card reader;
generate a secure hash from at least a portion of the information from the card reader;
determine whether the generated secure hash matches an account secure hash of a library account;
identify the library account as being associated with the information when the account secure hash of the library account matches the generated secure hash, the library account comprising library account information; and
retrieve the library account information from the library account in response to identifying the library account associated with the information.

12. The system of claim 11, wherein the card reader comprises a magnetic stripe reader, a radio frequency identification (RFID) reader, or a near field communication (NFC) reader.

13. The system of claim 11, wherein the computing device is configured to identify the library account associated with the information from the transaction card when the library account information includes the account secure hash that is identical to the generated secure hash.

14. A method for associating a library account with a transaction card, comprising:
obtaining information from the transaction card;
generating a secure hash using at least a portion of the information from the transaction card;
determining whether the generated secure hash matches an account secure hash of an existing library account; and
upon determining that the generated secure hash does not match the account secure hash of an existing library account, associating a library account with the information from the transaction card, wherein associating the library account with the information from the transaction card comprises associating the generated secure hash with the library account.

15. The method of claim 14, further comprising:
receiving authorization from a holder of the transaction card to charge fees associated with the library account to a financial account associated with the transaction card.

16. The method of claim 14, further comprising:
verifying a validity of the transaction card.

17. The method of claim 14, further comprising:
purging the information obtained from the transaction card after generating the secure hash.

\* \* \* \* \*